United States Patent [19]

Lindsley

[11] Patent Number: 5,993,883

[45] Date of Patent: Nov. 30, 1999

[54] SWEET DOUGH MIX

[75] Inventor: Mark A. Lindsley, Chebanse, Ill.

[73] Assignee: Bunge Foods Corporation, Bradley, Ill.

[21] Appl. No.: 09/069,662

[22] Filed: Apr. 29, 1998

[51] Int. Cl.[6] .............................. A21D 10/00; A23G 3/00
[52] U.S. Cl. ....................... 426/555; 426/561; 426/653; 426/658
[58] Field of Search .............................. 426/62, 549, 555, 426/561, 653, 654, 658, 573

[56] References Cited

U.S. PATENT DOCUMENTS

| | | | |
|---|---|---|---|
| 3,219,455 | 11/1965 | Debois | 99/90 |
| 3,676,150 | 7/1972 | Glicksman et al. | 99/90 |
| 4,172,154 | 10/1979 | von Rymon Lipinski | 426/549 |
| 4,395,426 | 7/1983 | Fan | 426/62 |
| 4,481,222 | 11/1984 | Fan | 426/62 |
| 4,622,226 | 11/1986 | Ke et al. | 426/94 |
| 4,741,907 | 5/1988 | Furuhashi | 426/90 |
| 5,133,984 | 7/1992 | Murphy et al. | 426/496 |
| 5,178,894 | 1/1993 | Rudel | 426/549 |
| 5,254,356 | 10/1993 | Busken | 426/553 |
| 5,336,515 | 8/1994 | Murphy et al. | 426/573 |
| 5,378,286 | 1/1995 | Chiou et al. | 127/36 |
| 5,395,638 | 3/1995 | Kincs et al. | 426/556 |
| 5,403,610 | 4/1995 | Murphy et al. | 426/549 |
| 5,447,738 | 9/1995 | de Bruijne et al. | 426/549 |
| 5,629,036 | 5/1997 | Yanetani et al. | 426/19 |

*Primary Examiner*—Nina Bhat
*Attorney, Agent, or Firm*—Cook, Alex, McFarron, Manzo, Cummings & Mehler

[57] ABSTRACT

A sweet dough dry mix is provided which incorporates highly viscous carboxymethyl cellulose in combination with hard wheat flour. When used to make up a sweet dough, the resulting dough exhibits enhanced handling when compared with similar formulations which do not incorporate the combination. Also provided are products baked from the sweet dough. These products have noticeably enhanced height and structured evenness, and they better retard staling when compared with other doughs omitting the carboxymethyl cellulose.

20 Claims, No Drawings

SWEET DOUGH MIX

BACKGROUND OF THE INVENTION

This invention generally relates to sweet dough mixes, especially so-called Danish-type sweet dough mixes, doughs and products baked from the doughs. More particularly, the invention relates to Danish dough mixes which work up into doughs having improved handling properties, which doughs bake up into sweet dough products having superior eating qualities, an advantageously soft texture, and an extended shelf life, particularly with respect to the onset of staleness. The sweet dough mix incorporates carboxymethyl cellulose.

Sweet or Danish dough systems are well known for making sweet rolls, pastries and the like. These doughs include substantial quantities of flour and of sweetening components such as granulated sugar, as well as other sweeteners. Products of this type are made in a variety of environments which vary in production volume. Included are Danish mixes intended for large volume baking production, such as is carried out at wholesale bakeries. Mixes of this type are typically sold in relatively large containers, such as 50-pound bags. Danish mixes of this type are added to other components at the wholesale bakery, for example. Typical components in this regard include eggs, yeast formulations, flavoring, water, and at times additional flour. Ingredients of this type are mixed in order to form a dough. Such doughs are then handled by commercial baking equipment. Such equipment manipulates the dough and/or provides the proper environment for the dough to develop certain attributes well known in the industry. Included is the use of equipment which passes the dough through or below rollers which flatten the dough and thin it to a shape suitable for forming into the sweet baked product being processed and made.

An issue which needs to be taken into consideration when processing sweet doughs on a large commercial scale is how well the sweet dough is handled by the dough production and baking equipment. At times, production difficulties are encountered because the dough exhibits an elastic character which tends to interfere with equipment which rolls the dough to shape and thin it to the extent required to makes these types of sweet baked goods. It is accordingly important that a sweet dough formulation be in a condition which is not so elastic as to shrink back after same is rolled by the dough handling equipment. It is accordingly desirable if a Danish sweet dough could be provided which is more easily handled when in its prebaked condition.

Sweet dough products are susceptible to the development of staleness after the sweet dough has been baked up into Danish-type pastries or other sweet dough originating baked products. One characteristic of staling is the gradual hardening of the baked product over time. Retardation of staleness is an important objective of baked products, particularly those which are baked on a wholesale level and which can be subjected to warehousing, transporting and shelf display times which allow for a greater opportunity for staling to develop before purchase and consumption. Shelf life issues of this type can be substantial in the realm of sweet dough baked goods which are sold within these types of channels of trade.

Issues which are almost always of substantial significance in baked dough products, particularly those sold at the wholesale level, include taste, eating quality, softness of texture, and moisture level. It is of course desirable that any attempted improvement in sweet dough mixes which are designed to improve on any of these attributes should not detrimentally affect any other attribute, whether it be a prebaked dough handling attribute, an attribute to address the staleness problem, or any other attempted improvement.

SUMMARY OF THE INVENTION

In accordance with the present invention, a sweet dough mix is provided which includes substantial quantities of wheat flour, typical quantities of at least one sweetening component, conventional ingredients including some or all of milk solids, emulsifiers, salts, leavening agents, fats, colors and flavors, for example. Also included is carboxymethyl cellulose which is added directly into the dry sweet dough mix without being dispersed in a carrier. The carboxymethyl cellulose is present at between about 0.1 and about 1.5 weight percent of the total weight of the wheat flour, typically between about 0.1 and about 0.8 weight percent, most preferably between about 0.2 and about 0.4 weight percent, based upon the total weight of wheat flour. When combined with typical additional dough ingredients such as egg, water, yeast and the like, the dough of the invention is made up. The finally baked product of the invention has a desirable soft texture, enhanced eating qualities and resists deterioration of these advantageous qualities over time and retards the development of staleness.

It is accordingly a general object of the present invention to provide improved sweet dough mixes which handle and store well.

Another object of this invention is to provide improved sweet dough mixes and doughs and baked products incorporating same, the improvement being centered around the inclusion of carboxymethyl cellulose in the sweet dough dry mix.

Another object of the present invention is to provide a sweet dough dry mix incorporating the combination of a hard wheat flour and a carboxymethyl cellulose gum to thereby provide an advantageous environment for interaction at a generally molecular level in order to achieve a better conditioned dough and a staling-resistant baked product.

These and other objects, features and advantages of the present invention will be apparent from and clearly understood through a consideration of the following detailed description.

DESCRIPTION OF THE PREFERRED EMBODIMENTS

Sweet mixes or Danish mixes in accordance with the present invention include substantial quantities of wheat flour. Wheat flour usually makes up at least about 60 weight percent of the dry mix. A typical range is between about 60 and about 75 weight percent, based upon the total weight of the mix, preferably between about 62 and about 68 weight percent, based upon the total weight of the mix. It is preferred that this wheat flour be of the type which is generally known as hard wheat. So-called hard varieties of wheat have a relatively high protein content. The protein content of a hard wheat is typically approximately 12 weight percent, usually tightly ranging between 11.5% and 12.5%. So-called soft wheats have a protein content on the order of about 8 weight percent.

Examples of suitable hard wheat components according to the invention include Ellison hard flour, Morebread hard flour, and the like. Often, these flours are bleached and enriched with enriching components such as niacin, reduced iron, thiamine mononitrate, riboflavin, folic acid, and the like. Moisture contents of these types of hard wheat flours typically range between about 12.5 and 14 weight percent. Maximum ash contents are usually about 0.5%.

Being a sweet dough dry mix, substantial quantities of one or more sweetening components are included. The sweetening components typically will comprise at least about 10 weight percent of the total weight of the dry mix. In a typical application, the sweetening component includes both granulated sugar and more natural sugars such as dextrose, glucose and the like. Generally, the sweetening component content within the dry mix will be between about 5 weight percent and about 20 weight percent, based upon the total weight of the dry mix. So-called granulated sugars are freeflowing, bright light granules which typically are approximately 99.9% sucrose in the form of free-flowing granular solids. Dextrose or corn sugar can be preferably combined with the use of granular sugar. An especially suitable dextrose is a highly purified crystalline product resulting from complete hydrolysis of corn starch. Such dextroses can be produced by the enzyme conversion of corn starch, followed by refining by ion-exchange demineralization. Such dextrose components are bland and sweet and are typically white, dry and crystalline.

In an important aspect of the invention, carboxymethyl cellulose (CMC) is added to the sweet dry mix. Typical sodium carboxymethyl cellulose is classified as a gum and is in the form of white granules, and the CMC is incorporated directly into the sweet mix in its dry form. It is preferred that the CMC be added as a non-hydrated component and without dispersing the CMC into any carrier, such as water. The CMC component first encounters water at the bowl level when subsequently combined with the other dough components during the dough making and baking operations. Such non-hydrated carboxymethyl cellulose is added dry to the dry sweet mix so as to attain a level of CMC within the dry mix of between about 0.1 and about 1.5 weight percent, typically between about 0.1 and about 0.8 weight percent, preferably between about 0.15 and about 0.5 weight percent, most preferably between about 0.2 and about 0.4 weight percent based upon the total weight of wheat flour. A typical sodium carboxymethyl cellulose is prepared by treating alkali cellulose with sodium chloroacetate.

While carboxymethyl cellulose components are available in various viscosities, it has been found to be especially advantageous to incorporate high viscosity CMC directly into the sweet mix. Especially preferred is a CMC component which has a viscosity of between about 1500 and about 3000 centipoise, measured by a Brookfield viscometer when in a one percent solution at 250° C. Thus, the preferred CMC component is especially thixotropic. It is also somewhat less hydroscopic than other CMC components of lower viscosities. An especially preferred high viscosity CMC is available from Hercules Company under the designation 7 HF. Especially when this high viscosity CMC is used, it can be important to avoid the higher levels of use noted herein. For example, conventional current large-scale dough-working equipment may have difficulty in handling doughs incorporating CMC contents much above 0.5 weight percent, based on the wheat flour.

Although not bound by any particular theory, it is currently believed that this CMC component interacts in an especially advantageous manner with the protein, such as flour protein or gluten, of the hard wheat flour. According to this belief, ionic charge coupling occurs between the wheat protein molecules and the CMC molecules. Water, which is subsequently added when the sweet mix is used to make up the sweet dough formulation, is believed to facilitate this ionic charge coupling. The CMC is believed to react in what is understood to be an ionic manner with the water soluble protein of the wheat flour. In this regard, it is preferred that the CMC be present at between about 0.3 and about 0.7 weight percent, based upon the total weight of the wheat flour. This attachment of CMC molecules to the wheat protein is believed to improve the workability of the flour by interacting with it while also modifying properties of the protein in order to modify its interaction with other components within the dough, even after the dough is baked into a finished product.

Whatever mechanism is in operation, the ultimate result is overall improvement in the handling attributes of the sweet dough prior to baking, as well as important improvements in the baked products themselves. More specifically, the inclusion of CMC relaxes the dough incorporating the mix and provides a better conditioned dough which is more easily machined out or rolled out. For example, when operated on by rollers of commercial-scale dough processing equipment, the dough does not shrink back, which is characteristic of doughs having substantial elasticity. Instead, doughs incorporating the mix according to the invention remain rolled out once thus flattened or thinned by rolling equipment or the like.

Because of the inclusion of the CMC component in the dough, the finally baked sweet dough products are judged to be more tender, more flavorful to eat, and exhibit a more pleasing mouth feel. Baked products according to the invention also have a noticeable improvement in height or volume.

In addition, the baked products are structurally more even, particularly with respect to the air cells present in the baked product. The cell structure is generally more even throughout. With the invention, individual cells are less likely to break open during the baking process and thus combine with other broken small cells in order to form less desirable larger air cells. This is believed to be due at least in part to a stronger cell wall structure allowing the cells to expand more readily. Often, such air cell formation is initiated by the action of leavening agents such as yeast, typically while the dough is within the proof box.

The inclusion of the CMC in accordance with the present invention is also instrumental in retarding staling of the baked products. An element of the staling process is having wheat granules move back toward their dry state. This process can be generally described as recrystallizing of starch granules. This effect is retarded when the present invention is practiced. It is believed that the CMC interferes with the tendency of the starch to recrystallize. This phenomena is illustrated by textural analysis data.

Due in part to the high viscosity characteristics of the carboxymethyl cellulose component according to the present invention, it is important to avoid excessive CMC addition. If this highly viscous CMC is added at too great a level, the workability of the subsequently formulated dough would be extremely difficult because the dough itself would become very viscous and difficult to reshape to the extent needed in making the baked product, particularly when using large-scale dough processing equipment. It will be appreciated that this is somewhat dependent upon the capabilities of the dough processing equipment.

Other components may be included within the sweet dry mix, these being generally appreciated in the art. A milk protein source will typically be included, such as nonfat dry milk, for example at a level of between about 4 and 6 weight percent based upon the total weight of the mix. Typical non-fat dry milk solids have a moisture level of about 4%. Another typical component is an edible oil, which can be present at levels of up to about 10 weight percent, based upon the total weight of the sweet dry mix, often at least about 5 weight percent. A bulk vegetable shortening which is suitable in this regard is partially hydrogenated vegetable oil, such as partially hydrogenated soybean oil. A typical iodine value is between about 75 and about 85. A typical solids fat index (SFI) profile for such hydrogenated soybean oils exhibits 22 to 26 units at 50° F., 12 to 15 units at 70° F., 1 to 2.5 units at 92° F., and less than 1 unit at 104° F. A further possible added component is defatted soy flour. Such a product can have a protein level of about 50 to 52% and a moisture level of about 6%.

Other typical ingredients included within the sweet dry mix include mono- and diglycerides of fat-forming fatty acids. These are generally characterized as emulsifiers, and when included will be at a level of about 2 weight percent, based upon the weight of the sweet dry mix. Salt in the form of sodium chloride also typically will be included, such being at a level of between about 1 and about 1.5 weight percent, based upon the weight of the sweet dry mix.

Another preferred and typical ingredient is sodium acid pyrophosphate, usually at a level of not greater than about 0.5 weight percent, based upon the weight of sweet dry mix. This is a baking powder component having leavening attributes. A similar typical component is sodium bicarbonate or baking soda, which can be present at levels of about 0.25 weight percent, based upon the weight of the sweet dry mix. Coloring components can also be added at the relatively low weight percent levels associated with these types of products. Thus, the total of chemical leavening and coloring agents will be between about 0.5 and about 1 weight percent, based upon the total weight of the sweet dry mix.

In preparing the sweet dry mix, the flour and sugar bulk ingredients, typically with the non-fat dry milk component, are blown into the ribbon blender. Thereafter, the lower quantity or trace ingredients, most notably including the carboxymethyl cellulose component, are then blown into the ribbon blender. The liquefying components such as the emulsifier and bulk vegetable oil are then drawn into the ribbon blender and blended for at least five minutes, to a temperature maximum of about 80° F. (26.7° C.). Formulation of the mix is completed by running the flow from the ribbon blender through a disintegration mill having a screen sized at about 0.25 inch. Such a mix formulation has a total moisture content which is typically lower than 10% by weight and a pH of about 6.0 to about 7.0.

The resulting dry Danish mix is suitable for bagging and making into a sweet dough when desired. This Danish mix is the majority component of the sweet dough, typically making up between about 60 and 70 weight percent, based upon the total weight of the dough formulation. Another typical component is an egg source, such as between about 3 and 8 weight percent whole eggs, based upon the total weight of the dough formulation. A cream yeast, which is an active wet yeast, is incorporated at a level of about 2 to 7 weight percent, based upon the total weight of the dough formulation. Water is also incorporated into the dough formulation, often in separate stages, to achieve a total water content of about 20 to 30 weight percent, based upon the total weight of the dough formulation. These components are added to commercial dough mixing equipment in accordance with generally known procedures.

In preparing the baked sweet dough products, the mixed dough is subjected to commercial-scale baking operations. Usually this includes a substantial time in one or more retard chambers, for several hours at between about 35 and about 42° F. (between about 1.5 and 5.60° C.), such being in accordance with generally appreciated procedures. Lamination with a roll-in composition can follow, after which additional retard chamber time can be carried out. After passage through reducing rollers, the dough is subjected to proof box conditions at high humidity, followed by oven baking and cooling.

The following examples are illustrative of some of the aspects of the present invention.

EXAMPLE 1

A Danish dry mix was prepared to include 2659 pounds of Morebread hard flour having a protein level of about 12.1 weight percent; 300 pounds of Ellison hard flour having a protein level of 12.2 weight percent; 90 pounds defatted soy flour; 500 pound granulated sugar; 200 pounds dextrose; 430 pounds partially hydrogenated soybean oil having a iodine value of about 80; 200 pounds nonfat dry milk solids; 90 pounds mono- and diglycerides of fat-forming fatty acids prepared from edible vegetable fat; 50 pounds sodium chloride; 17 pounds sodium acid pyrophosphate baking powder; 13 pounds sodium bicarbonate baking soda; 1.4 pounds yellow color; and 7.5 pounds high viscosity carboxymethyl cellulose (Hercules 7 HF). Of these, the flour and sugar bulk components were combined and they were then blended together with the bulk vegetable oil, and the trace components were added thereafter. The latter included the carboxymethyl cellulose, which was added in its dry gum state without dissolving or dispersing in water or any other solvent. Such CMC was added at a level of about 0.25 weight percent of the wheat flour.

EXAMPLE 2

The sweet flour dry mix in accordance with Example 1 was combined with whole eggs, cream yeast and water in customary proportions. Without adding any roll-in component, the dough was shaped as a Danish pastry, proofed, cut to 56 grams, and baked at 375° F. (190.6° C.) for 12 minutes. A total of 30 tests were performed on the thus baked pastries, using current and conventional commercial-scale equipment. The dough was readily processed by this equipment, including without experiencing shrink back after rolling. For these 30 tests, the average height was 1.5 cm, the average width was 12.00 cm, and the average volume was 330 cc. This represented a substantial height and volume increase over prior art baked pastries of about the same weight and which excluded CMC from the dry mix but which were otherwise similarly prepared. Such prior art pastries have a height of about 1.0 cm, a width of about 8.5 cm, and a volume of not more than about 300 cc.

EXAMPLE 3

A Danish dry mix having ingredients and proportions in accordance with Example 1 was used to make up a Danish sweet dough. 1600 grams of the Danish mix were blended with 140 grams of whole egg, 36 grams of cream yeast, and 712 grams of water. More specifically, the Danish mix was first blended with the yeast for one minute within a model A120T Hobart mixer. The water and liquid whole egg components were next added and mixed for about one minute until the dough was formed. The water temperature was 39° F. (3.9° C.) and the dough temperature was 82° F. (27.8° C.)

The Danish dough was placed on a floured sheet pan, a bag was placed around the pan, and this was subjected to a cool environment of 40° F. (4.4° C.) over night. The dough was worked and given a 3—3 fold with a commercial roll-in formulation. 622 grams of roll-in were used with 2488 grams of dough. This was allowed to rest in a cooler at 40° F. (4.4° C.) for at least two hours.

A Danish roll was made up to a diameter of 2.5 inches, with a water wash and sugar. Pieces cut to 2 ounces (56.7 grams) were placed on a paper lined sheet pan and proofed at 90° F. (32.2° C.) and 90% humidity for about one hour. Thereafter, the Danish rolls were baked at 370–3750° F. (187.8–190.6° C.) for 12 minutes. The baked Danish rolls were judged to have good volume and texture.

EXAMPLE 4

Another dough formulation was made up from 3544.5 pounds of the Example 1 dry mix, 310 pounds of whole egg, 248 pounds of cream yeast, 1231.5 pounds of water added in a first mixing stage and 177.2 pounds of water added in a second mixing stage. This Danish mix had been modified to include 9 pounds of 7 HF CMC. This represented a CMC content of 0.39 weight percent, based upon the weight of wheat flour in the sweet dough dry mix. This Danish sweet dough was processed and baked in accordance with Example 2. Resulting Danish products were judged to have excellent results. Good volume and good texture were evident.

EXAMPLE 5

Example 4 was essentially repeated, except a higher level of CMC was used. In this case, 17.7 pounds of CMC were included within the Danish mix, such being approximately 0.77 weight percent, based upon the weight of the wheat flour. The dough was judged to be too stiff for optimum use within older conventional commercial-scale dough handling equipment, but it was successfully processed manually. The resulting Danish rolls nevertheless exhibited good volume and good texture.

EXAMPLE 6

Example 4 was substantially repeated, except the level of CMC was substantially higher, the Danish mix including 35.4 grams of CMC, which indicates 1.54 weight percent CMC, based upon the weight of wheat flour. The dough was very tough and stiff and less satisfactory for use within currently used commercial production scale dough handling equipment, although the resulting baked Danish rolls had good volume and texture when processed manually.

EXAMPLE 7

A dough formulation generally in accordance with Example 3 was made up with 0.5 weight percent CMC, based on the weight of wheat flour present in the formulation. This formulation was in accordance with the invention. A control formulation was also made up to be virtually the same, except no CMC was added. Each dough formulation was baked into an unlaminated Danish product to which no roll-in had been added. Both types of baked products were subjected to textural analysis testing using Instron equipment, specifically Stable Micro Systems Texture Expert equipment. This equipment was fitted with a plexiglass cylindrical probe which was one inch in diameter.

Each baked Danish product was cut to a height of 25 mm and was compressed to approximately 50% of that height. The probe was directed to the freshly severed side of the Danish product and the puncture test was carried out. The puncture test inserted the probe to approximately one-half of the compressed Danish product. The probe encountered only internal crumb and no crust. Double compression testing was carried out through a grid system to ensure the second insertion was in registration with the location within the baked product of the first insertion. The first insertion provided a relative indication of softness, texture and starch granule recrystallization to give an objective indication of staleness. The probe was fully retracted after about 4 seconds. After waiting about 8 seconds, the second compression was carried out for evaluation of springiness, with withdrawal being completed in about 3 seconds.

The baked products in accordance with the invention registered 300 grams force for the first insertion and 260 grams force for the second insertion. The control products registered 400 grams force for the first insertion and 350 grams force for the second insertion. From these data, it is observed that the control required 100 grams of additional force in order to penetrate the same distance when compared with the force required for the first insertion into the products according to the invention. Thus, the control required one-third more force during the first insertion, thereby indicating significant staleness when compared with the baked product made by the formulation according to the invention.

It will be understood that the embodiments of the present invention which have been described are illustrative of some of the applications of the principles of the present invention. Various modifications may be made by those skilled in the art without departing from the true spirit and scope of the invention.

I claim:

1. A sweet dough dry mix, comprising:

between about 60 and about 75 weight percent of wheat flour, based upon the total weight of the sweet dough dry mix;

at least about 10 weight percent of a sweetening component, based upon the total weight of the sweet dough dry mix; and a gum component consisting essentially of between about 0.1 and about 1.5 weight percent of non-hydrated carboxymethyl cellulose, based upon the total weight of said wheat flour of the sweet dough dry mix, said carboxymethyl cellulose having been added directly into the sweet dough dry mix in non-dispersed form, and said carboxvmethyl cellulose has a viscosity between about 1500 and about 3000 centipoise.

2. The sweet dough dry mix in accordance with claim 1, wherein said non-hydrated carboxymethyl cellulose had been added directly into the dry mix without being dispersed within a solvent.

3. The sweet dough dry mix in accordance with claim 1, wherein said wheat flour is a hard wheat flour.

4. The sweet dough dry mix in accordance with claim 3, wherein said wheat flour has a protein content of between about 11.5 and about 12.5 weight percent, based upon the total weight of the wheat flour.

5. The sweet dough dry mix in accordance with claim 4, wherein said carboxymethyl cellulose is present at from about 0.2 to about 0.4 weight percent, based upon the total weight of said wheat flour of the sweet dough dry mix.

6. The sweet dough dry mix in accordance with claim 1, wherein said carboxymethyl cellulose is a highly thixotropic gum.

7. The sweet dough dry mix in accordance with claim 1, wherein said carboxymethyl cellulose is present at from about 0.1 to about 0.8 weight percent, based upon the total weight of said wheat flour of the sweet dough dry mix.

8. The sweet dough dry mix in accordance with claim 1, wherein said carboxymethyl cellulose is present at from about 0.15 to about 0.5 weight percent, based upon the total weight of said wheat flour of the sweet dough dry mix.

9. A sweet dough dry mix, consisting essentially of:
   between about 60 and about 75 weight percent of wheat flour, based upon the total weight of the sweet dough dry mix;
   at least about 10 weight percent of a sweetening component, based upon the total weight of the sweet dough dry mix;
   between about 0.1 and about 1.5 weight percent of non-hydrated carboxymethyl cellulose, based upon the total weight of said wheat flour of the sweet dough dry mix, and said carboxymethyl cellulose has a viscosity between about 1500 and about 3000 centipoise; and
   a milk protein source, an emulsifier, a salt, and a leavening agent.

10. The sweet dough dry mix in accordance with claim 9, wherein said mix further includes at least about 5 weight percent of an edible oil.

11. The sweet dough dry mix in accordance with claim 9, wherein said wheat flour is a hard wheat flour which has a protein content of between about 11.5 and about 12.5 weight percent, based upon the total weight of the wheat flour.

12. A sweet dough, comprising:
    a dry mix including:
      between about 60 and about 75 weight percent of wheat flour, based upon the total weight of the sweet dough dry mix;
      at least about 10 weight percent of a sweetening component, based upon the total weight of the sweet dough dry mix; and
      a gum component which is between about 0.1 and about 0.8 weight percent of non-hydrated carboxymethyl cellulose, based upon the total weight of said wheat flour of the dry mix, said carboxymethyl cellulose having been added directly into the sweet dough dry mix in non-dispersed form, and said carboxymethyl cellulose has a viscosity between about 1500 and about 3000 centipoise; and
    additional dough components including an egg component, a yeast component and water;
    wherein said sweet dough is relaxed so as to be readily processed by commercial dough processing equipment without experiencing shrink back after rolling.

13. The sweet dough in accordance with claim 12, wherein carboxymethyl cellulose molecules attach to wheat flour molecules in order to thereby modify properties of said wheat flour.

14. The sweet dough in accordance with claim 12, wherein said wheat flour is a hard wheat flour.

15. The sweet dough in accordance with claim 14, wherein said wheat flour has a protein content of between about 11.5 and about 12.5 weight percent, based upon the total weight of the wheat flour.

16. The sweet dough in accordance with claim 12, wherein said carboxymethyl cellulose is a highly thixotropic gum.

17. The sweet dough in accordance with claim 12, wherein said carboxymethyl cellulose is present at from about 0.1 to about 0.5 weight percent, based upon the total weight of said wheat flour of the sweet dough dry mix.

18. A baked sweet dough product prepared by baking a sweet dough comprising:
    a dry mix including:
      between about 60 and about 75 weight percent of wheat flour, based upon the total weight of the sweet dough dry mix;
      at least about 10 weight percent of a sweetening component, based upon the total weight of the sweet dough dry mix; and
      between about 0.1 and about 1.5 weight percent of non-hydrated carboxymethyl cellulose, based upon the total weight of said wheat flour of the mix, said carboxymethyl cellulose having been added directly into the sweet dough dry mix in non-dispersed form, and said carboxymethyl cellulose has a viscosity between about 1500 and about 3000 centipoise; and
    additional dough components including an egg component, a yeast component and water;
    wherein said baked sweet dough product exhibits a greater height when compared with a baked sweet dough product made from a dough identical to said sweet dough but which omits said carboxymethyl cellulose.

19. The baked sweet dough product in accordance with claim 18, wherein said wheat flour is a hard wheat having a protein content of between about 11.5 and about 12.5 weight percent.

20. The baked sweet dough product in accordance with claim 18, wherein the baked product has greater staleness retarding attributes and is more even in structure than products baked from a sweet dough which is identical to said sweet dough but which omits said carboxymethyl cellulose.

* * * * *

UNITED STATES PATENT AND TRADEMARK OFFICE
CERTIFICATE OF CORRECTION

PATENT NO.  : 5,993,883
DATED       : November 30, 1999
INVENTOR(S) : Mark A. Lindsley It is certified that error appears in the above-identified patent and that said Letters Patent is hereby corrected as shown below:

Col. 1, line 42, delete "makes" and insert --make--.
Col. 3, line 14 delete "freeflowing" and insert --free-flowing--; line 50, delete "250°" and insert --25°--.
Col. 6, line 3, delete "5.60°" and insert --5.6°--; line 18, delete "pound" and insert --pounds--; line 19, "a iodine" should read --an iodine--.
Col. 7, line 10, delete "3750°" and insert --375°--.
Col. 8, line 47, delete "carboxvmethyl" and insert --carboxymethyl--.

Signed and Sealed this

Twenty-second Day of May, 2001

Attest:

NICHOLAS P. GODICI

Attesting Officer

Acting Director of the United States Patent and Trademark Office